N. McQUEEN.
CUSHION TIRE FOR WHEELS.
APPLICATION FILED OCT. 3, 1910.
1,035,128.
Patented Aug. 6, 1912.
2 SHEETS—SHEET 1.
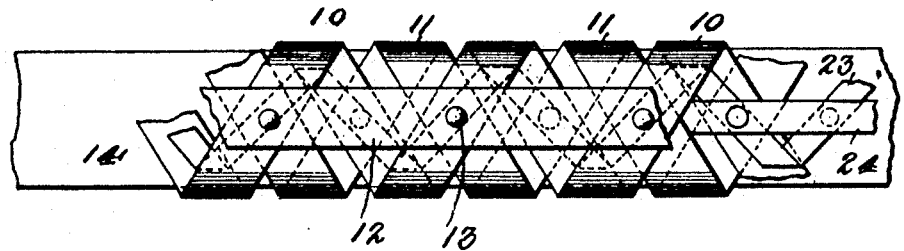
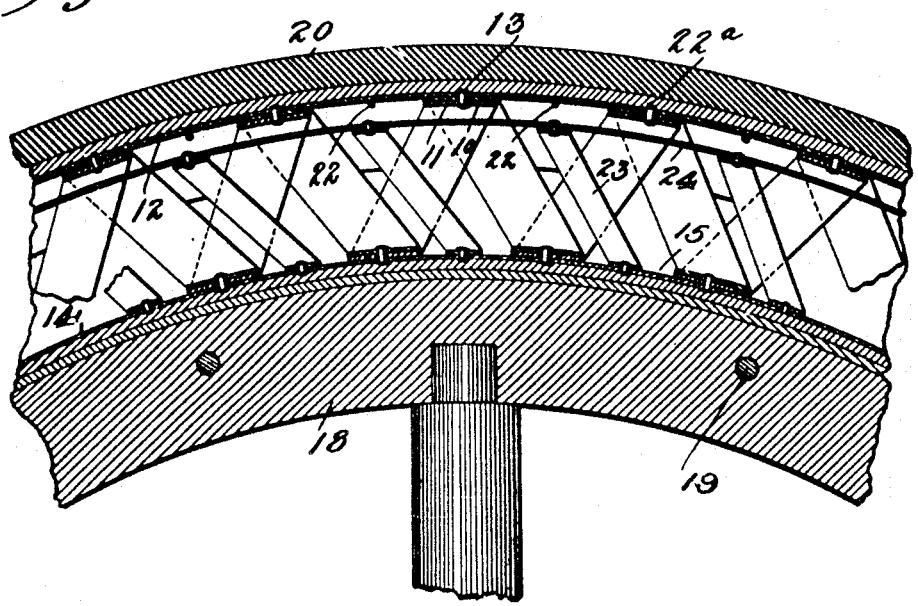

N. McQUEEN.
CUSHION TIRE FOR WHEELS.
APPLICATION FILED OCT. 3, 1910.
1,035,128.
Patented Aug. 6, 1912.
2 SHEETS—SHEET 2.
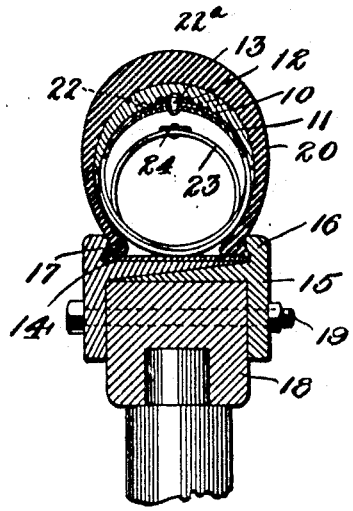
Fig. 3.
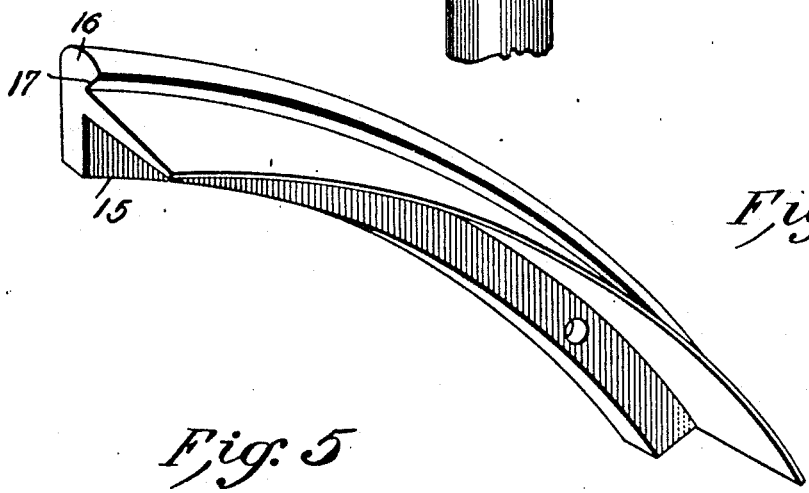
Fig. 4.
Fig. 5
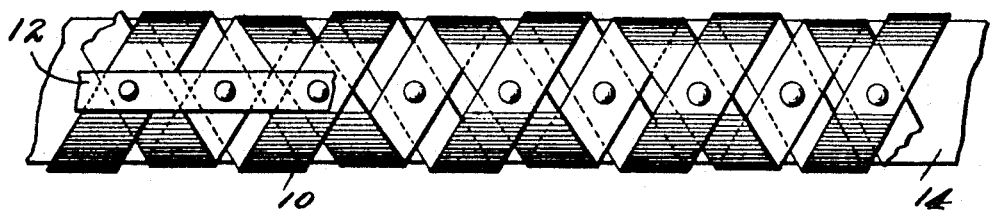
Witnesses
Jo. F. Collins
J. P. Tarbox
Inventor
Neill McQueen.
By Meyers, Cushman & Rea
Attorneys

UNITED STATES PATENT OFFICE.

NEILL McQUEEN, OF LUDOWICI, GEORGIA.

CUSHION-TIRE FOR WHEELS.

1,035,128.  Specification of Letters Patent.  Patented Aug. 6, 1912.

Application filed October 3, 1910. Serial No. 585,150.

*To all whom it may concern:*

Be it known that I, NEILL McQUEEN, a citizen of the United States, residing at Ludowici, in the county of Liberty and State of Georgia, have invented new and useful Improvements in Cushion-Tires for Wheels, of which the following is a specification.

My invention relates to vehicle tires of the type commonly known as cushion tires, and has particular relation to those tires of that type, in which are used flexible metallic springs for securing the cushioning effect of the tire. While of the particular relation stated, however, it will be evident upon an understanding of my invention that the same may be used in part or as a whole in connection with other types of tires. Especially is this true in connection with the armor type of pneumatic tire.

The object of my invention is to secure a tire which has a maximum of flexibility, which at the same time is simple and rugged in its construction, is cheap to manufacture, and possesses with its ruggedness such durability as to make it equally as advantageous in use as the now commonly used pneumatic tire.

The prime purpose of my invention, of course, is to do away with the expense incident to the present extensive use of the pneumatic tire, which has so many troublesome weak points, and to the use of which as is well known there are so many objections. The pneumatic tire possesses the great advantage of giving most excellent cushioning, and it is an aim of my invention to secure this same cushioning effect by the use of a suitably constructed airless tire.

In the accomplishment of my invention I make use of a flexible metallic body, which has sufficient stiffness to enable it to stand up under the heavy load of the weight of vehicle, and which at the same time has sufficient resiliency to give the desired cushioning effect. This flexible metallic main body I form by intertwining two spirals of spring material and giving them a circular shape of a diameter corresponding to the diameter of the wheel on which the tire is to be used. I further connect these strips together in a special manner to secure the greatest strength, connecting the turns of the spirals together at the overlapping portions, and also connecting by a continuous strip the successive turns of the spirals, so that lateral as well as peripheral bracing of the individual turns is had. Further I provide an improved means for connecting the tire to the wheel felly, this means comprising an attaching strip secured to the inner portions of the main body, and embraced by rim sections. This means is both simple and efficient. The rim sections are, of course, secured to the felly. And still further I provide an outer envelop covering the main body of the tire for the purpose of preventing the wear which would otherwise be given the body portion when it is made of metal. This envelop I secure in place by the same rim sections which secure the body of the tire in place. Preferably I also provide a protecting sheath between the main body of the tire and the flexible outer envelop.

In the accompanying drawings I have shown two forms of my invention, the first of which is formed by two plaited spirals of strip material, and the second of which is formed by two simple intertwined or telescoped spirals.

In the drawings:—Figure 1 is a top plan view of the spring cushion structure of the tire. Fig. 2 is a central section of the same, the section being taken in the plane of the wheel and centrally of Fig. 1. Fig. 3 is a transverse section of the tire of this form. Fig. 4 is a perspective view of one of the rim sections. Fig. 5 is a top plan view of a modified form of tubular spring structure.

Referring to the drawings 10 and 11 represent the spirals. As shown in Fig. 1 these spirals are intertwined and overlapped, first one spiral and then the other being given the outside position. The result of this is that the spirals are lapped at certain points, and that at these points first one spiral is on the outside, and then the other spiral is on the outside. This is clearly shown in Fig. 2. In the form shown in Fig. 5 this plaiting is not done, but the spirals are simply intertwined or placed one within the other after the fashion of telescoping sections as shown.

The individual successive turns of the spirals are secured together by continuous strips 12 which extend from one turn to another around the entire tire. Preferably the strip extends over the lapped portions of the spirals, and the turns of the respective spirals and the connecting strips are secured together by rivets 13 at the overlapped points. Preferably the spirals are so positioned with respect to each other and so dimensioned that the lapped points are at the extreme outer or tread portions of the body of the tire and at the extreme inner or attaching portions of the tire.

The strip 12 secures together the outer portions of the body of the tire. The inner portions are secured together by a relatively wider strip 14 which extends similarly from turn to turn of the spirals, and similarly connects them together at the lapped portions. This strip is of such width that it extends laterally for quite a little distance. The body of the tire is attached to the felly of a wheel by this strip. To this end rim sections 15, one on each side of the main body are provided. These rim sections are provided with flanges 16 at their tops, and adjacent inwardly and laterally projecting wedge portions 17. The flange portion and the wedge portions are spaced apart to form a groove in which the attaching strip 14 engages.

The rim sections are fitted to the sides of a wheel felly 18 as shown, the wedge portions being some distance above the bottoms of the sections, and are clamped together upon the wheel felly and upon the attaching strip 14 by means of bolts 19, which pass through each section and the felly. The wedge portions, it will be observed, overlap each other, one of them fitting snugly up against the attaching strip and wedging it in the opposite groove, and the other of which fits snugly beneath the first one. They are so dimensioned and proportioned as to enable the rim sections to occupy the proper radial position, and to fit the felly of the wheel accurately.

If used alone this tire would give excellent results, but in order to prevent water and mud from causing the tire to wear, and mud from accumulating between and within the spirals, I provide an outer envelop covering the main body. This envelop is designated 20. It may be made of rubber as is now the common practice. It is similarly formed, the clencher portions of the outer covering being seated in the jam between the flanges 16 and the body of the tire. The flanges 16 are chamfered on their inner portions in order to hold this outer envelop in place as is now done by clencher rims. This outer covering is protected from being cut by the main body of the tire which is preferably made of flexible material, such as spring steel, by a sheath 22ᵃ of leather, canvas or other flexible material placed between the body portion of the tire and the tread portion of the outer envelop. Preferably this inner sheath is only of sufficient width to protect the wear which would take place on the tread portion of the tire. By it all cutting and abrasion of the inside of the outer envelop is prevented. It is in this embodiment secured by suitable clips 22 which extend under the strip as shown.

The action of the tire of my invention when running on a vehicle under load, should be readily apparent. There is abundant room for flexure of the turns of the spirals, and this flexure takes place on the individual turns of the spirals successively as the wheel turns. Owing to the construction which I employ, this flexure is gradual, and further owing to the nature of the springs constituted by the individual turns, the flexure is so distributed as to give the greatest durability to the body of the tire. Upon the striking of an obstruction, the flexure is of a degree greater than normal corresponding to the degree of impact upon the obstruction. If the spirals are properly dimensioned, as they will be for each size of machine on which the tire is used, the cushioning effect on striking obstructions will be very excellent. It may equal or approach most closely to that given by the pneumatic tire.

For protection against too great flexure under abnormal strains I employ an additional inner cushion spiral 23, the turns of which are secured to the attaching strip 14 between the turns of the main spirals. The upper portions of the turns project between the upper portions of the turns of the main spirals, and are interconnected by a strip 24, similar to strip 12. This inner spiral cushions abnormal strains, the strip 24 being engaged directly by strip 12 under these conditions.

What I claim is:—

1. In a resilient tire, a base strip, a pair of intertwined spiral spring strips secured at their inner crossed portions to the base strip, an envelop inclosing the spiral strips, and a reduced spiral strip located within the intertwined strips and having its inner portions secured to the base strip between the inner crossed portions of said intertwined strips, the convolutions of the reduced strip being arranged between and in parallelism with the convolutions of one of the intertwined strips whereby its outer portions support the envelop at intermediate points when flexed.

2. In a resilient tire, a base strip, a pair of intertwined spiral spring strips secured at their inner crossed portions to the base strip, a peripheral strip secured over the outer crossed portions of the intertwined strips, an envelop inclosing the strips and being supported by the outer crossed portions of the intertwined strips, a reduced spiral strip secured at its inner side to the base strip at points between the inner crossed portions of the intertwined strips and having its helices extending outwardly in parallelism with the helices of one of the intertwined strips to reinforce the envelop at intermediate points when flexed, and an inner peripheral strip secured across the outer portions of the reduced spiral strip to hold the helices thereof in position.

In testimony whereof I have hereunto set my hand in presence of two subscribing witnesses.

NEILL McQUEEN.

Witnesses:
J. GRANVILLE MEYERS,
GERTRUDE M. STUCKER.

Copies of this patent may be obtained for five cents each, by addressing the "Commissioner of Patents, Washington, D. C."